Dec. 3, 1929.                    M. RIVKIN                    1,738,393
                          INTEGRAL WHEEL AND AXLE
                     Filed April 25, 1928      3 Sheets-Sheet 1
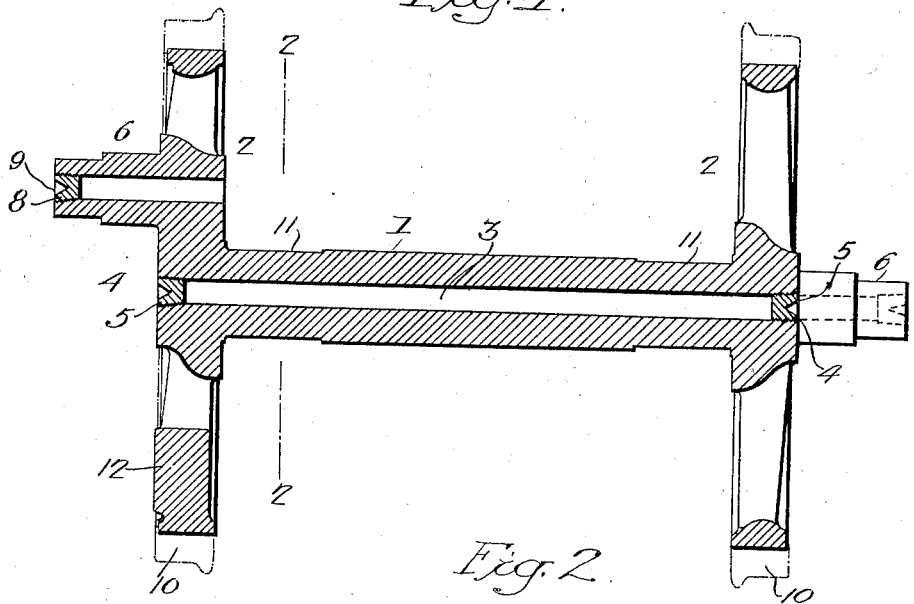
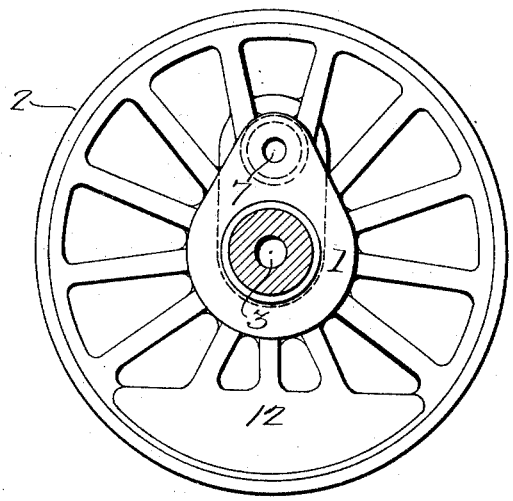

Dec. 3, 1929.　　　M. RIVKIN　　　1,738,393
INTEGRAL WHEEL AND AXLE
Filed April 25, 1928　　3 Sheets-Sheet 2

Inventor,
Menahem Rivkin
by his Attorneys
Howson & Howson

Dec. 3, 1929.    M. RIVKIN    1,738,393
INTEGRAL WHEEL AND AXLE
Filed April 25, 1928    3 Sheets-Sheet 3

Inventor
Menahem Rivkin
by his Attorneys

Patented Dec. 3, 1929

1,738,393

UNITED STATES PATENT OFFICE

MENAHEM RIVKIN, OF PHILADELPHIA, PENNSYLVANIA

INTEGRAL WHEEL AND AXLE

Application filed April 25, 1928. Serial No. 272,726.

My invention relates to certain improvements in wheels and axles, and particularly the driving wheels and bearing wheels of locomotives.

The object of my invention is to make the wheels and axles in unitary castings.

The invention also relates to making wheels and axles, as well as wrist-pins in unitary castings.

The invention further relates to certain details of construction which will be fully described hereinafter.

In the accompanying drawing:

Fig. 1 is a sectional view of an integral driving wheel and axle for a locomotive illustrating my invention;

Fig. 2 is a sectional view on the line 2—2, Fig. 1;

Figure 3:
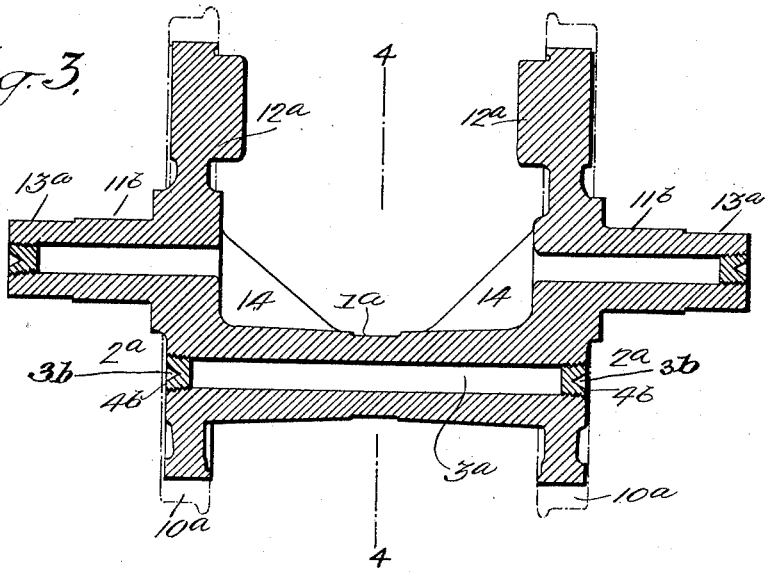
Fig. 3 is a view illustrating my invention applied to a locomotive crank axle.

It has been the usual practice, particularly in the construction of locomotive axles, wheels and wrist-pins, to make them separate and then assemble them, the wheels being driven on the axles and the wrist-pins being driven into openings in the wheels.

In locomotives, the constantly changing stresses on wheels and axles due to the change in direction of force when the locomotive is in operation, and particularly locomotive crank axles, the joints are liable to work loose. By making the crank axle and wheel as a unitary structure, this objection is overcome and the structure is much lighter than the built-up structure and can be so designed as to take up considerable less space. This is very important for crank axles for three-cylinder locomotives, and particularly the three-cylinder locomotives of the narrow gauge type.

The one-piece axles and wheels require less machining and fitting of parts, and, therefore, are easier to produce than the built-up units.

By making the wheels and axles integral, the space between the centers of the wrist-pin and axle may be decreased to a minimum, making this construction especially adapted for short-stroke locomotives.

Figs. 1 and 2 illustrate my invention as being applied to locomotive driving wheels and a straight axle. In these figures 1 is the axle and 2 are the wheel centers cast integral with the axle. Extending through the wheels and axle is an opening 3 which reduces the weight of the structure considerably and also provides for the proper cooling of the casting. This opening is closed at both ends by plugs 4 which have center recesses 5 on which the casting can be turned in a lathe. 6 are wrist-pins which are made integral with the wheel centers 2. Openings 7 extend through both the wheels and the wrist-pins, the opening being closed by a plug 8 having a centering recess 9. 10 are the tires of the wheels which are shrunk upon the centers in the usual manner, and these tires may be plain or flanged as shown in Fig. 1. 11 are the inside journals for the inside boxes mounted in the frames of the locomotive. Opposite the wrist-pins are counter-balance weights 12 of the usual type.

Figure 4:
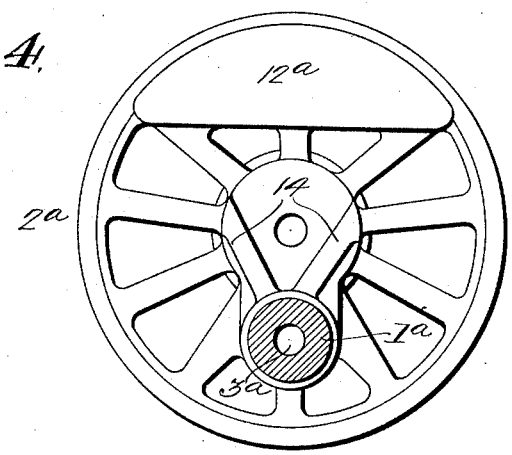
Fig. 4 is a sectional view on the line 4—4, Fig. 3.

In Figs. 3 and 4, I have illustrated a construction in which the axle is in the form of a crank axle and cast integral with the wheels. $1^a$ is a crank axle, the center of which is some distance from the center of the wheels. This axle is cast integral with the wheels $2^a$ and is reinforced by diagonal webs 14. The bearing journals $11^b$ are also cast integral with the wheels and have extensions $13^a$ to which the outside cranks are attached. The counter-balance weights $12^a$ are located in this instance on the wheel centers and on these centers are the usual tires $10^a$. Extending through the crank $1^a$ and the wheel centers is an opening $3^a$, and in the bearing journals are openings $3^b$ closed by plugs $4^b$ having center recesses.

Figure 5:
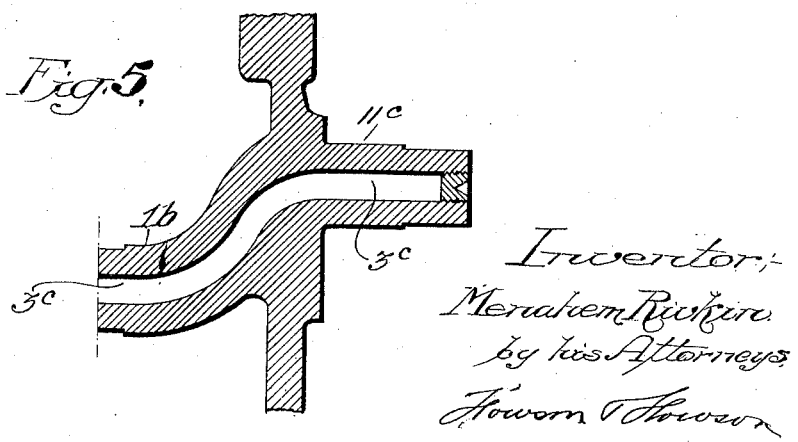
Fig. 5 is another form of crank axle and wheel.

In Fig. 5 is shown a modification, in which the crank axle $1^b$ is curved at each end and joins the hub of the wheel center, the opening $3^c$ in this instance being continuous through the crank and the bearing journal 11ᶜ.

Figure 6:
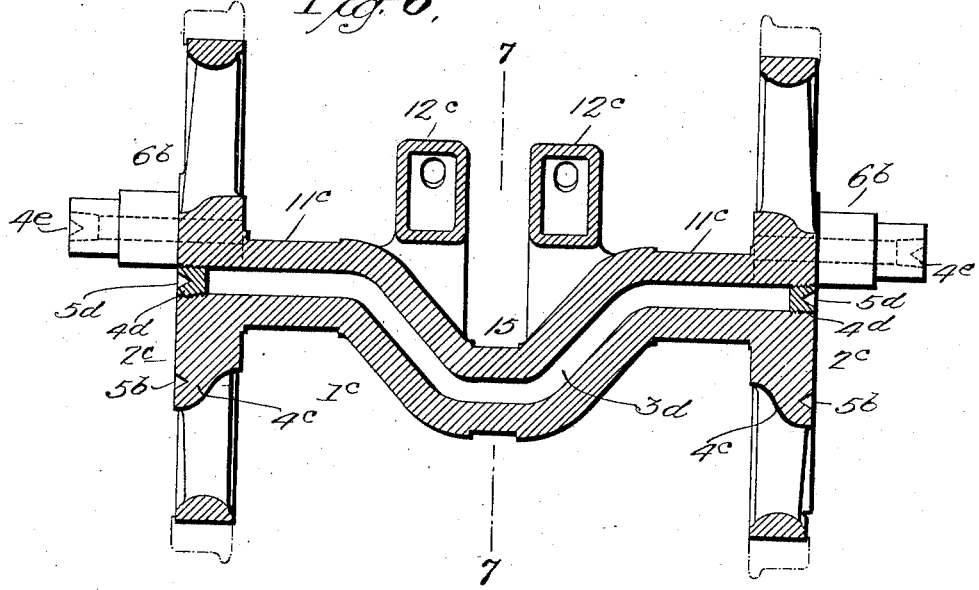
Fig. 6 is a view of a crank axle having inside bearings.
Figure 7:
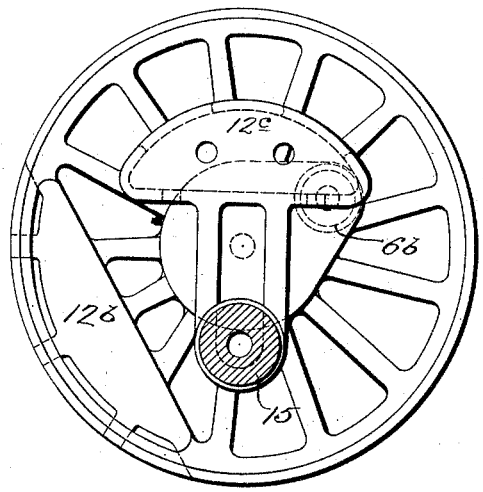
Fig. 7 is a sectional view on the line 7—7, Fig. 6.

Figs. 6 and 7 illustrate further modifications, in which is shown a crank axle 1ᶜ and inside bearing journals 11ᶜ, the whole being made integral with wheel centers 2ᶜ. In this instance, the wrist-pins 6ᵇ are made integral with the wheel centers and the counterbalance weights 12ᶜ for the crank project from the crank on each side of the crank bearing 15. The counter-balances 12ᵇ for the wrist-pins are of usual construction. Located in line with the center of the crank bearing 15 are extensions of the hub having center bearing recesses 5ᵇ, as shown in Fig. 6. The center bearings 5ᵈ are in plugs 4ᵈ, and the plugs 4ᵉ in the wrist-pins have center bearings, so that the wrist-pins can be turned as well as the wheels and the crank bearing. The opening 3ᵈ extends from one side of the structure to the other and through the wheels and crank axle and is closed at each end by plugs 4ᵈ. The counter-balances are preferably made hollow and provided with core openings so that material may be added when weight is required.

While I have shown the counter-balances on the crank, they may be on the wheel centers.

I claim:—

1. A wheel structure, consisting of an axle with a wheel at each end of the axle; and wrist-pins projecting from the wheels, said structure being made as an integral casting, three longitudinal openings extending through the axle and through the wrist-pins respectively.

2. A wheel structure, consisting of two wheel centers; and an axle extending from one wheel center to the other and cast integral with said centers, said axle being located at one side of the center line through the wheels and forming a crank.

MENAHEM RIVKIN.